UNITED STATES PATENT OFFICE.

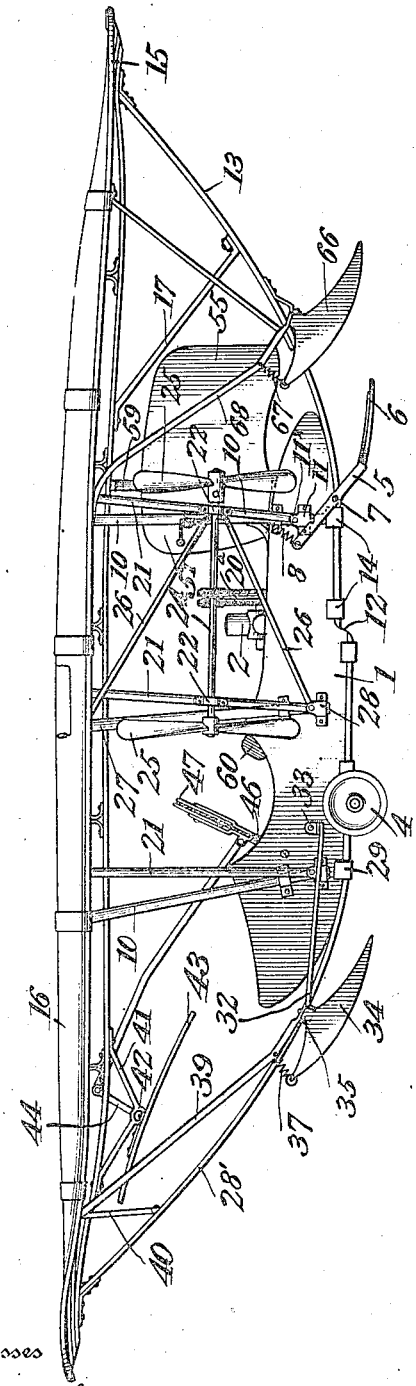

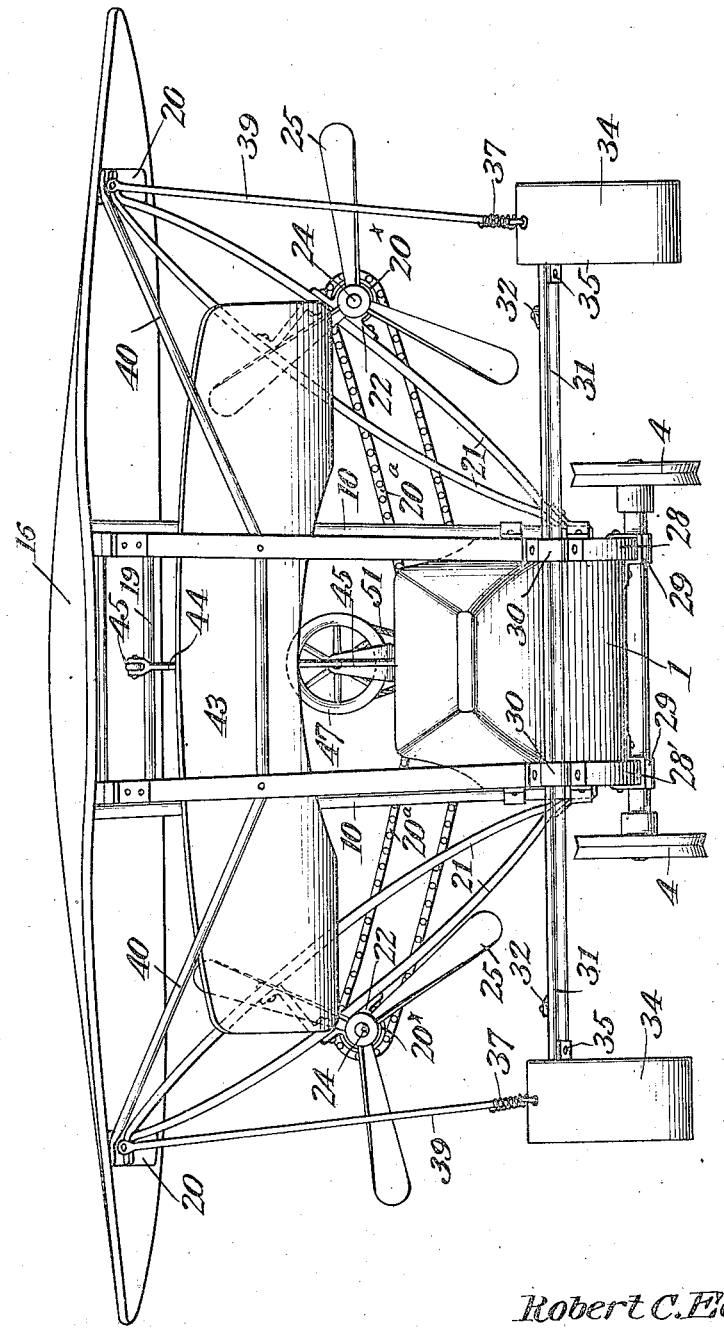

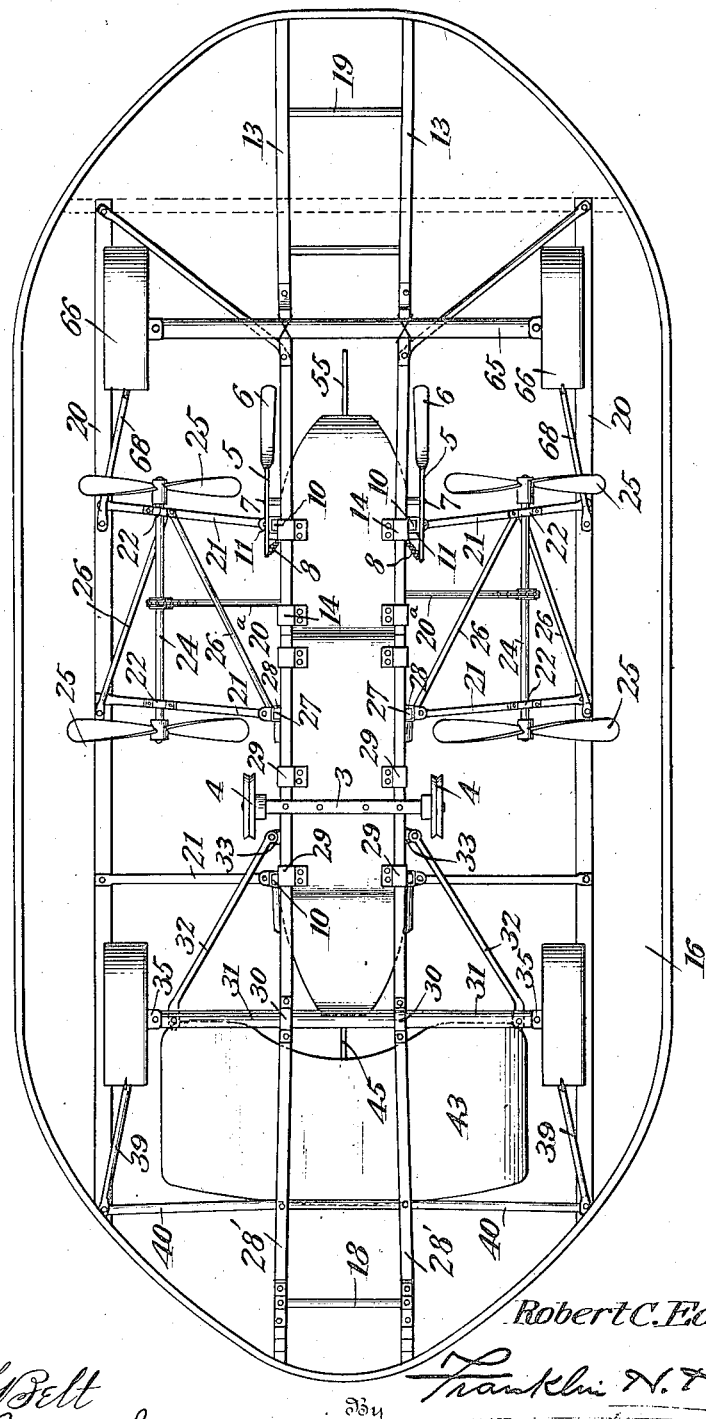

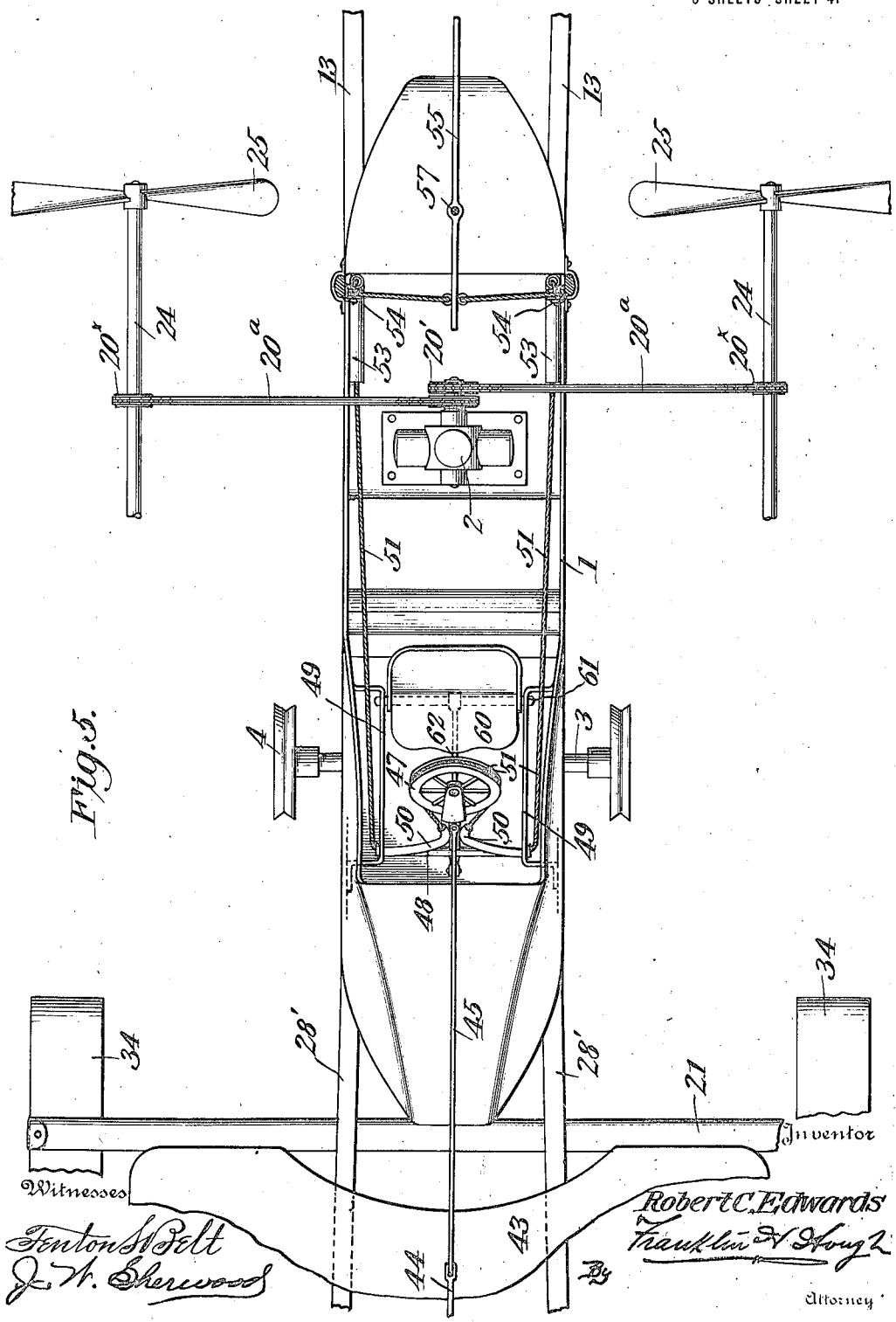

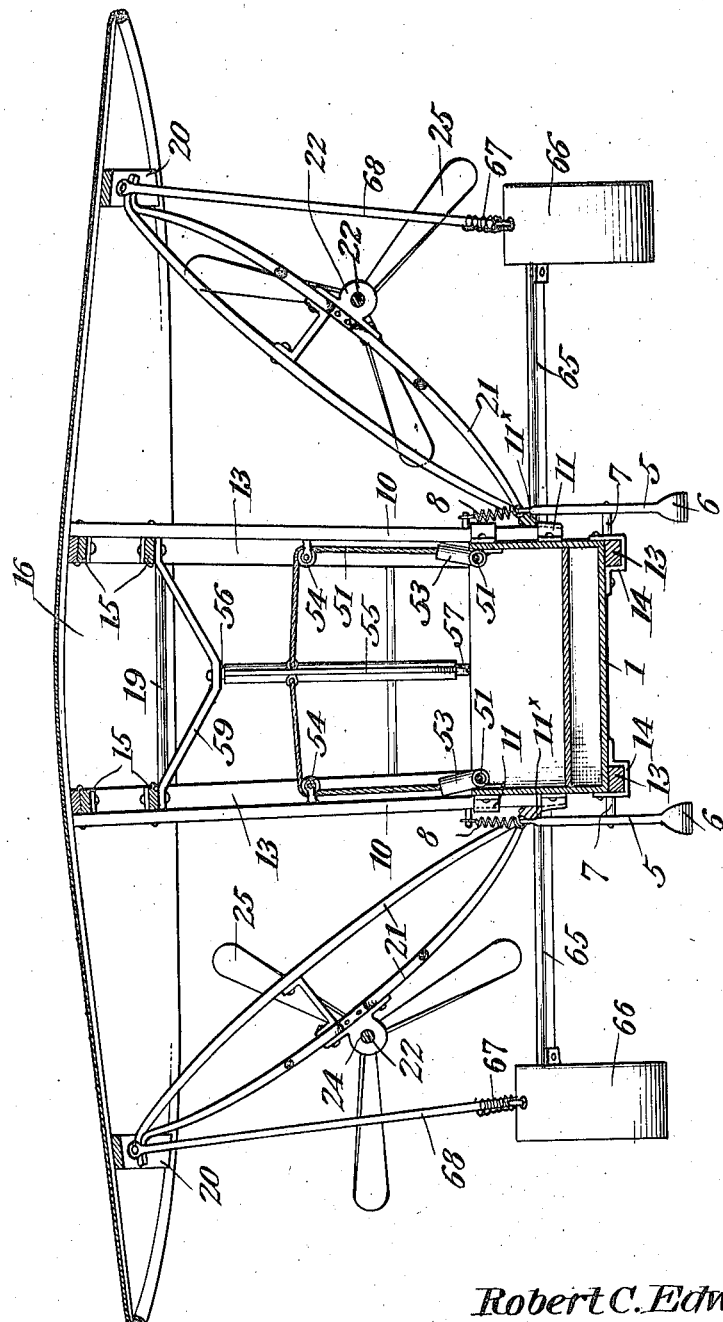

ROBERT CHARLES EDWARDS, OF CANNELTON, INDIANA, ASSIGNOR OF ONE-HALF TO OTTO KNIESCHE, OF TELL CITY, INDIANA.

HYDROAEROPLANE.

1,156,218. Specification of Letters Patent. Patented Oct. 12, 1915.

Application filed October 1, 1914. Serial No. 864,469.

*To all whom it may concern:*

Be it known that I, ROBERT C. EDWARDS, a citizen of the United States, residing at Cannelton, in the county of Perry and State of Indiana, have invented certain new and useful Improvements in Hydroaeroplanes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in flying boats or hydroaeroplanes and comprises an apparatus of this nature having various details of construction, combinations and arrangements of parts which will be hereinafter fully described, shown in the accompanying drawings and then specifically defined in the appended claims.

Figure 7:
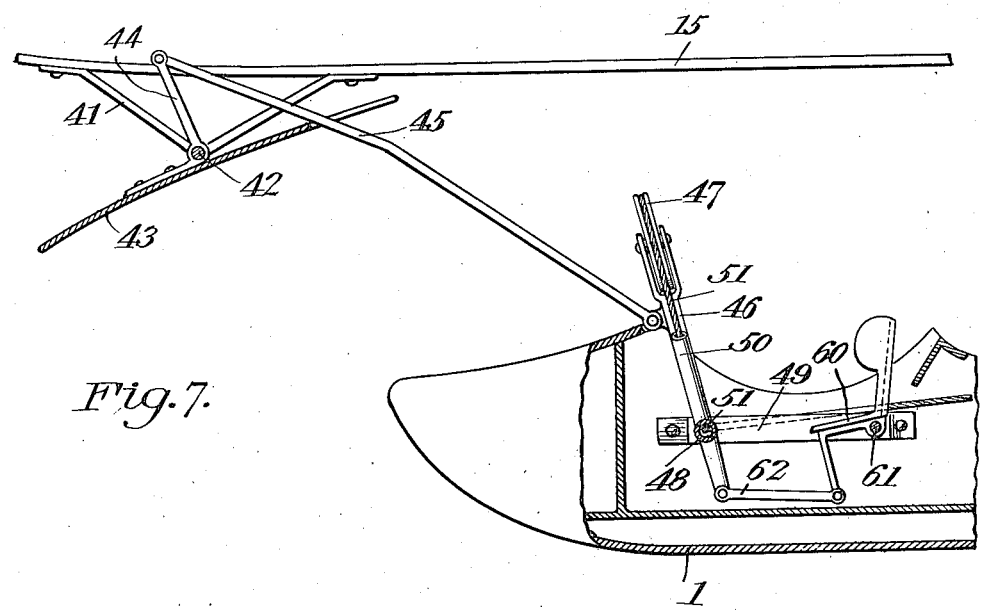
Figure 8:
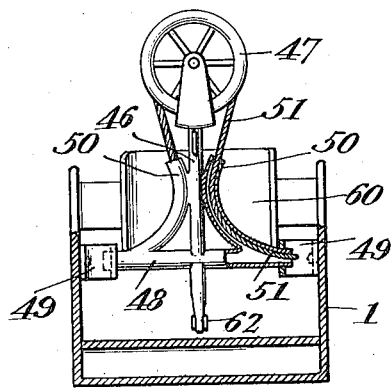

My invention is illustrated in the accompanying drawings, in which:

Figure 1 is a side elevation of the hydroaeroplane. Fig. 2 is a front elevation. Fig. 3 is a bottom plan view. Fig. 4 is a central longitudinal sectional view. Fig. 5 is a top plan view with the plane removed. Fig. 6 is a vertical central sectional view, and Figs. 7 and 8 are detail views of parts of the apparatus.

Reference now being had to the details of the drawings by numeral, 1 designates the body portion of the boat which may be of any size or shape and which is adapted to contain the motor 2 for driving the propellers. A shaft 3 is fastened to the boat and upon which the wheels 4 are journaled, and bars 5, having buffers 6 upon the ends thereof, are pivotally mounted upon the pins 7, and springs 8 are connected at their forward ends to the upper ends of the bars 5 and their other ends are secured to the standards 10 held by the straps 11 upon the opposite sides of the boat near the rear end thereof. Said buffers are adapted to take up shock incident to the boat coming in contact with the ground or other object when the apparatus is alighting.

Upon reference to the drawings, it will be noted that the under surface of the bottom has a recess 12 and bowed braces 13 are held by straps 14 fastened to the bottom of said recessed portion along the marginal edges of the boat, said braces extending rearward and are fastened to the rear end of the truss braces 15 which support the plane 16. Diagonally disposed braces 17 are fastened at their lower ends to the bowed braces 13 and their upper ends are secured to the truss braces 15. In the drawings I have illustrated two of the truss braces 15 parallel to each other and spaced apart, being reinforced by the cross braces 18 and 19.

Longitudinal bars 20 are secured to the plane 16 and diagonally disposed truss braces 21 are fastened at their lower ends to the supports 10, one upon either side, and to the lugs $11^x$ which are integral with the straps 11 and their upper ends are fastened to the bars 20 upon the plane. Said braces 21 have bearing members 22 fastened thereto and in which the propeller shafts 24 are journaled, having propeller wheels 25 at the ends thereof. Said propeller shafts have sprocket wheels $20^x$ secured thereto and sprocket chains $20^a$ connect the same with the motor by connection with the sprocket wheels $20'$ upon the latter. V-shaped braces 26, each have a lower end fastened to a supporting standard 27, held by the straps 28 and the angled portion of each brace 26 is secured to a truss 21, while the upper end of each V-shaped brace is fastened to a bar 20, as shown clearly in the drawing. By this means, the truss braces which hold the propeller shafts will be held rigidly and securely in place.

Other bowed braces, designated by numeral $28'$, are held by the straps 29 to the bottom of the boat in advance of said recessed portion and their forward ends are secured to the forward ends of the truss braces 15.

Straps, designated by numeral 30, are fastened to the bowed braces $28'$ a slight distance above the bottom of the board, and 31 designates a resilient bar passing through said straps and held rigidly by means of bolts 32 to the rear edge of the boat. Said bar 31, it will be noted upon reference to Fig. 2, projects beyond the opposite sides of the car considerable distances, and floats 34 are provided with lugs 35 which are secured to the ends of said bar, while the forward end of each float is connected by means of a spring 37 with a brace rod 39 fastened to the bar 20 on the under surface of the plane 16. The forward ends of the brace bars $28'$ are further reinforced by the brace rods 40 which are secured at their upper ends to the forward ends of the bars 20.

Fastened in the bracket arms 41, which are secured to the under edge of the truss braces 15, is a rock shaft 42 to which the raising and lowering plane 43 is fixed and an arm 44 projects from said plane 43 and is pivotally connected by means of a bar 45 to the post 46 in which the steering wheel 47 is pivotally mounted. Said steering post is mounted upon a rock shaft 48 journaled in the angle bars 49, secured to the opposite sides of the boat, and curved tubes 50 are fastened to the post at points diametrically opposite and serve as guides for the cable 51 which passes about the grooved circumference of the steering wheel and thence passes rearwardly to and through the curved tubes 53, thence over the pulleys 54, and the ends of the cable are secured to the opposite sides of the rudder 55 which has pintles 56, and 57 in its upper and lower edges, the latter of which is journaled in the bearing in a deck of the boat and the other pintle in a bearing in a cross bar 59 which is fastened to the truss braces 15.

A pivotal seat and back, designated by numeral 60, is pivotally mounted upon a shaft 61 and a rod 62 pivotally connects said seat with a bar projecting from the rock shaft carrying the steering wheel and affords means whereby the operator, by tilting the seat and back, may cause the steering wheel to swing back and forth to adjust the angle of the raising and lowering plane 43, accordingly as it may be desired to cause the aeroplane to be disposed at different inclinations in the act of raising and lowering.

A flexible bar 65, similar to the bar 30 before described, is mounted in straps fastened to the braces 13 a slight distance beyond the rear of the boat and floats 66 are fastened one to each end of the bar 65, while springs 67 connect the forward ends of the floats 66 with the braces 68. It will be understood that the portions of the bars 30 and 65 which project intermediate the straps to hold the same to the braces 28' and 13 respectively, are resilient and, by reason of their thinness, the bars will yield in the event of pressure coming upon said floats and, when the pressure is relieved, the bars will return to their normal positions.

In operation, the propellers are driven in the usual manner by the motor and, when it is desired to cause the hydroaeroplane to rise from the ground or surface of the water, the operator by tilting the seat may cause the lifting plane 43 to be tilted in proper position to cause the craft to pass into the air when sufficient momentum is produced and, by the tilting of the rock shaft, the craft may be caused to raise or lower, while, by the rotary movement of the steering wheel in one way or the other, the rudder may be operated to direct the forward line of travel of the craft. In the event of the boat lighting on the surface of the water, the floats, one upon either side, will yield to absorb the shock and will tend to balance the craft upon the surface of the water, the spring-pressed buffers serving as a means for taking up shock in case the boat lands upon the ground. The floats at either the forward or rear end of the boat will also serve as shock absorbers in the event of the craft lighting upon land.

While I have shown a particular detailed construction of apparatus embodying the features of my invention, it will be understood that various modifications in the detailed construction of the apparatus may be made without departing from the spirit of the invention.

What I claim to be new is:

1. A hydroaeroplane comprising a boat, bowed braces secured longitudinally to the bottom thereof, planes secured to the upper ends of said braces, resilient cross bars fastened to said bowed braces and projecting beyond the opposite sides of the car, and floats rigidly secured to the ends of said resilient bars.

2. A hydroaeroplane comprising a boat having an offset under the rear portion thereof, straps secured to the bottom of said boat adjacent to its opposite edges, bowed braces engaging said straps, a plane secured to said braces, straps secured to said bowed braces, resilient bars passing through said straps upon the braces and projecting beyond the opposite sides of the boat, floats rigidly fastened to the ends of said bars.

In testimony whereof I hereunto affix my signature in presence of two witnesses.

ROBERT CHARLES EDWARDS.

Witnesses:
 THOMAS J. QUICK,
 GEO. GANNON.